United States Patent [19]

Laine et al.

[11] Patent Number: 4,716,142

[45] Date of Patent: Dec. 29, 1987

[54] CATALYSTS FOR THE HYDRODENITROGENATION OF ORGANIC MATERIALS AND PROCESS FOR THE PREPARATION OF THE CATALYSTS

[75] Inventors: Richard M. Laine, Palo Alto; Albert S. Hirschon, Menlo Park; Robert B. Wilson, Jr., Mountain View, all of Calif.

[73] Assignee: SRI International, Menlo Park, Calif.

[21] Appl. No.: 900,447

[22] Filed: Aug. 26, 1986

[51] Int. Cl.$^4$ ............ B01J 21/04; B01J 27/049; B01J 27/051

[52] U.S. Cl. ............ 502/220; 502/221; 208/254 H

[58] Field of Search ............ 502/220, 221, 313, 314, 502/315; 208/254 H

[56] References Cited

U.S. PATENT DOCUMENTS

| | | | |
|---|---|---|---|
| 3,094,480 | 6/1963 | Richardson | 208/254 |
| 3,422,002 | 1/1969 | Kovach et al. | 502/220 X |
| 3,988,334 | 10/1976 | Finch | 260/449.6 |
| 4,284,531 | 8/1981 | Simpson | 252/465 |
| 4,304,573 | 12/1981 | Burgles et al. | 44/51 |
| 4,306,985 | 12/1981 | Wulfers | 252/51.5 R |
| 4,326,995 | 4/1982 | Berg | 252/465 |
| 4,457,836 | 7/1984 | Seiver | 208/254 H |
| 4,462,897 | 7/1984 | Miller | 208/254 H |
| 4,504,589 | 3/1985 | Ryan | 502/314 X |
| 4,508,847 | 4/1985 | Chianelli | 502/200 |
| 4,513,098 | 4/1985 | Tsao | 502/216 |
| 4,522,709 | 6/1985 | Aldag | 208/216 R |
| 4,547,285 | 10/1985 | Miller | 208/89 |

FOREIGN PATENT DOCUMENTS

| | | |
|---|---|---|
| 50911 | 5/1982 | European Pat. Off. |
| 133031 | 2/1985 | European Pat. Off. |
| WO86/01743 | 3/1983 | PCT Int'l Appl. |

OTHER PUBLICATIONS

R. M. Laine, "Comments of the Mechanisms of Heterogeneous Catalyses of the Hydrodenitrogenoation Reaction", in Catalysis Reviews—Science and Engineering, vol. 25 (#3), pp. 459-474, publ. by Marcel Dekker, Inc.

T. J. Lynch et al., "Iron Carbonyl Catalyzed Reduction of Model Coal Constituents Under Water Gas Shift Conditions", Preprints American Chemical Society, Division of Fuel Chemistry, vol. 28, No. 1, pp. 172-179 (1983).

S. H. Yang et al., "Some Effects of Sulfiding of a N:Mo-/Al2O3 Catalyst on its Activity for Hydrodenitrogenation of Quinoline", Journal of Catalysis, vol. 81, pp. 168-178 (1983).

T. G. Harvey et al., "Hydrodenitrogenation Catalyzed by Zeolite-supported Ruthenium", Journal of the Chemical Society, Chemical Communications, pp. 188-189 (1985).

(List continued on next page.)

*Primary Examiner*—W. J. Shine
*Attorney, Agent, or Firm*—Phillips, Moore, Lempio & Finley

[57] ABSTRACT

The present invention discloses a process for forming a catalyst for the hydrodenitrogenation of an organic feedstock, which includes (a) obtaining a precatalyst comprising cobalt and molybdenum or nickel and molybdenum; (b) adding in a non-oxidizing an atmosphere selected from hydrogen, helium, nitrogen, neon, argon, carbon monoxide or mixtures thereof to the precatalyst of step (a), a transition metal moiety selected from compounds of iridium, rhodium, iron, ruthenium, tungsten or mixtures thereof for a time and at a temperature effective to chemically combine the components; and (c) heating the chemically combined catalyst of step (b) optionally in vacuum to remove residual volatile organic materials. Preferably, a precatalyst of cobalt-/molybdenum or alumina is heated between 100° and 500° C. in a hydrogen atmosphere with an organometallic moiety of ruthenium, preferably ruthenium carbonyl. The invention further includes the catalysts obtained and the process of hydrodenitrogenation of organic feedstocks including a crude petroleum residue, a petroleum fraction, an oil shale fraction, a tar sands fraction, a coal derived powder, a coal derived liquid or mixtures thereof. The process reduces the amount of hydrogen usually needed to obtain hydrodenitrogenation and more selectively produces aromatic product than saturated organic product.

47 Claims, 12 Drawing Figures

OTHER PUBLICATIONS

T. Lynch et al., "Synergism and Phase Transfer Effects in Hydrogenations of Model Coal Constituents Using Iron Carbonyl as a Catalyst", Journal of Molecular Catalysis, vol. 178, pp. 109-112 (1982).

R. H. Fish, "Homogeneous Catalytic Hydrogenation 3. Selective Reductions of Polynuclear Aromatic and Heteroaromatic Nitrogen Compounds Catalyzed by Transition-Metal Carbonyl Hydrides", in Annals of the New York Academy of Sciences, vol. 415 (edited by D. W. Slocum and W. R. Moser), pp. 292-310 (1983).

R. M. Laine et al., "Novel Catalytic Methods for Heteroatom Removal in Coal Liquids Upgrading", SRI-International, 333 Ravenswood Ave., Menlo Park, CA 94025, Contract No. DE-FG22-83PC 60781, for the Department of Energy, Feb. (?) 1986.

Y. Liu et al., "Catalytic Functionalities of Supported Sulfides III Correlation of Activities at Elevated Pressure with Oxygen Chemisorption", Bulletin Societic Chim. Belgique, vol. 93, No. 8-9, pp. 627-634 (1984).

F. Mondragon et al., "Coal Liquification by the Hydrogen Produced From Methanol", Fuel, vol. 63, pp. 579-585, (May 1984).

J. F. Cochetto et al., "Chemical Equilibria Among Quinoline and its Reaction Products in Hydrodenitrogenation", Ind. Eng. Chem., Process Res. Div., vol. 20, #11, 981 (1980).

T. G. Harvey et al., "Hydroprocessing Catalysts by Supported Ruthenium Sulfide," Journal of Catalysis, vol. 101, pp. 253-261 (1986).

Shabati et al., "Changes in C-O and C-N Hydrogenolysis Selectivities as a Function of Promoter Type", Symposia Preprints, p. 231, Division of Petroleum Chemistry, Annual Meeting of American Chemical Society New York, N.Y., April 13, 1986.

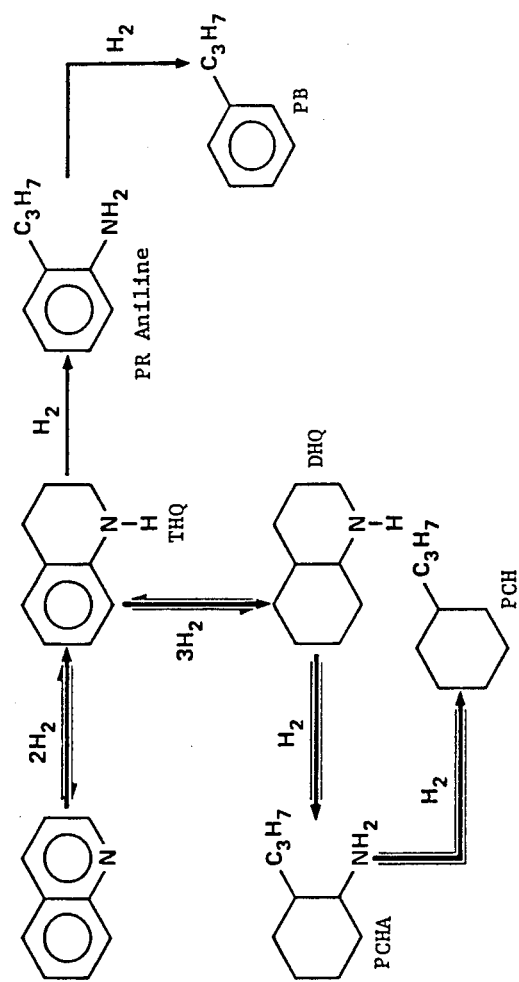
FIGURE 1  QUINOLINE HDN REACTION NETWORK

PRODUCT DISTRIBUTION DUE TO HYDROGENATION REACTIONS

PRODUCT DISTRIBUTION DUE TO HYDROGENATION REACTIONS
(Concluded)

PRODUCT DISTRIBUTION DUE TO CARBON-NITROGEN CLEAVAGE REACTIONS WITH CoMo CATALYST

PRODUCT DISTRIBUTION DUE TO CARBON-NITROGEN CLEAVAGE REACTIONS WITH CoMo CATALYST (Concluded)

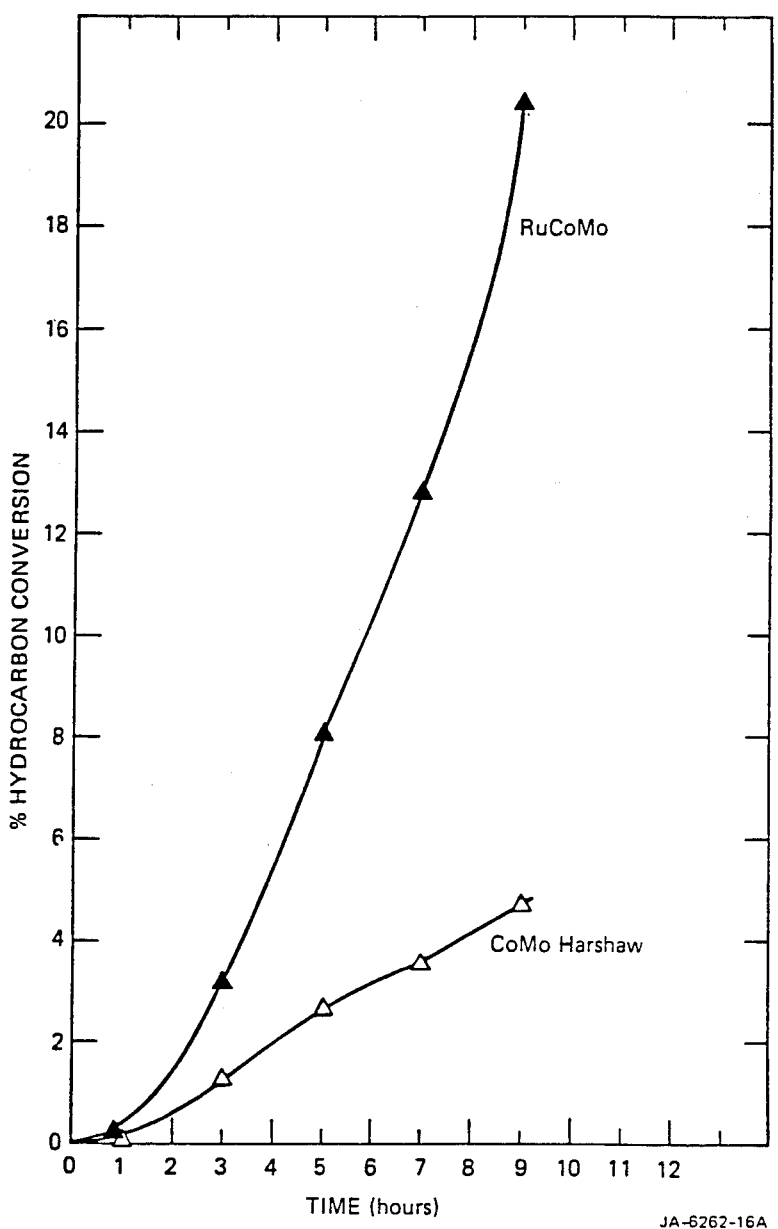
FIGURE 4 TOTAL HYDROCARBON CONVERSION

PRODUCT DISTRIBUTION DUE TO HYDROGENATION
REACTIONS WITH RhCoMo CATALYST

PRODUCT DISTRIBUTION DUE TO CARBON-NITROGEN
CLEAVAGE REACTIONS WITH RhCoMo CATALYST

PRODUCT DISTRIBUTION DUE TO HYDROGENATION
REACTIONS WITH RuNiMo CATALYST

PRODUCT DISTRIBUTION DUE TO CARBON-NITROGEN
CLEAVAGE REACTIONS WITH RuNiMo CATALYST (a) Tungsten-Doped CoMo Catalyst
(0.100 g; 1.73% Co, 7.74% Mo, 2.92% W, 6.71% S)

JA-327532-2A

PRODUCT DISTRIBUTION DUE TO HYDROGENATION
REACTIONS WITH TUNGSTEN-DOPED CoMo CATALYST (b) Tungsten-Doped CoMo Catalyst
(0.100 g; 1.73% Co, 7.74% Mo, 2.92% W, 6.71% S)

PRODUCT DISTRIBUTION DUE TO CARBON-NITROGEN CLEAVAGE REACTIONS WITH TUNGSTEN-DOPED CoMo CATALYST (Concluded)

CATALYSTS FOR THE HYDRODENITROGENATION OF ORGANIC MATERIALS AND PROCESS FOR THE PREPARATION OF THE CATALYSTS

ORIGIN OF THE INVENTION

This invention was made in the course of research partially sponsored by the Department of Energy through grants DE-FG22-83P C60781 and DE-FG-85-PC80906, and partially supported by grant CHE82-19541 of the National Science Foundation. The invention is subject to Public Law 96-517 (and amendments), and the United States Government has rights in the present invention.

BACKGROUND OF THE INVENTION

1. Field of the Invention

The present invention relates to producing a selective hydrodenitrogenation catalyst which is effective in the removal of nitrogen from an organic material. More specifically, the present invention relates to the preparation and use of catalysts which comprise transition metal compounds, cobalt or nickel and molybdenum which improve hydrodenitrogenation under conditions of heat and pressure.

2. Description of the Prior Art

Hydrodenitrogenation (HDN) is the catalytic process by which nitrogen is removed as ammonia when feedstocks, such as petroleum, are refined to produce fuel or petrochemical feedstocks. HDN is also an important step in the conversion of coal, coal liquids, oil shale, tar sands, residues and the like to synthetic fuels. If nitrogen is not removed during the refining of the hydrocarbon feedstocks, during subsequent refining, products form having undesirable characteristics. For example, the basic nitrogen-containing species can effectively poison the acid hydrocracking and reforming catalysts used in the refining process. Consequently, HDN is vital and necessary to produce high-quality, low-cost fuels and feedstocks.

At an industrial level, HDN catalysis is usually performed using heterogeneous catalysts consisting of either cobalt molybdenum oxides (CoMo), nickel and tungsten oxides (NiW) or nickel and molybdenum oxides (NiMo) supported on alumina ($Al_2O_3$ or $Al_2O_3$—$SiO_2$). HDN is usually performed at about 350°–500° C. and up to several thousand psi of hydrogen pressure.

It is generally difficult, to effectively evaluate CoMo- or NiMo-catalyzed HDN of crude feedstocks. Solvent refined coal (SRC) as a feedstock has been used to evaluate some catalyst performance. Usually, catalysis studies are conducted on model compounds, such as pyridine, indole or preferably quinoline. These model compounds most closely resemble the basic nitrogen - containing compounds found in feedstocks. Studies performed with NiMo catalysts and quinoline have resulted in the HDN reaction network shown in Reaction Sequence 1 in FIG. 1. The ideal HDN catalyst should have high C-N bond activity while having low hydrogenation activity, therefore selectively producing more aromatic compounds. Thus, in comparing the effectiveness of the HDN catalysts, the proportion of propylbenzene (4 moles $H_2$ required) to propylcyclohexane (7 moles $H_2$ required) is a key measure of the hydrogen consumption.

Some general observations are made by R. Laine on the mechanisms of heterogeneous catalysis in the hydrodenitrogenation reaction in *Catalytic Reviews of Science and Engineering*, Vol. 25, No. 3, Pages 459–474 published in 1983, which is incorporated herein by reference. Laine discusses the catalytic clevage of saturated C-N bonds in the a transalkylation reaction at 125° C.: $R_3N + R'_3N \rightarrow R_2NR' + R'_2NR$ in the presence of metal carbonyls, such as $Ru_3(CO)_{12}$.

Other reports of research in this area include the following:

In U.S. Pat. No. 4,504,589, Ryan discloses a method and a catalyst having improved hydrodenitrification (hydrodenitrogenation-HDN) activity. The hydrotreating catalysts have catalytically active amounts of Group VIII and/or Group VIB metals incorporated into a support which comprises adding from about 0.5 to 15 percent by weight of molybdenum and/or tungsten carbonyls to the catalyst by sublimation and drying and calcining the metal carbonyl impregnated catalyst. The specific metal carbonyls examined were molybdenum, chromium and tungsten which were sublimed onto a commercial nickel/molybdenum/$Al_2O_3$ hydrotreating catalyst. After calcining the metals added were assumed to have the form $MoO_3$, $CrO_3$ and $WO_3$.

In European Patent Organization No. 50911, A. W. Tait et al. disclose a catalyst and process for the hydrodenitrogenation and hydrocracking of high-nitrogen feedstocks. A catalyst is disclosed which comprises a hydrogenation component itself comprising chromium, molybdenum, and at least one metal of Group VIII, a crystalline molecular sieve zeolite, and a porous refractory inorganic oxide. Zeolites having pore diameters of at least 5 Angstroms and containing exchangeable cations are suitable. These include faujasite-type crystalline alumino-silicates, ZSM5-type crystalline aluminosilicates and others.

In European Patent Organization Pat. No. 133031, R. R. Chianelli et al. disclose bulk and supported, self-promoted molybdenum and tungsten sulfide catalysts formed from bis (tetrathiometallate) precursors and their preparation and use for hydrotreating. Metal promotors such as nickel, cobalt or iron are disclosed.

S. H. Yang et al. in the *Journal of Catalysis*, Vol 81, Pages 168–178 (1983) disclose a method of presulfiding a commercial NiMo/$Al_2O_3$ catalyst which has a significant effect on its activity for the HDN of quinoline. Further during the reaction the addition of $H_2S$ increases the HDN rate and its removal decreases the rate in a reversible manner.

Y-YP. Tsao in U.S. Pat. No. 4,513,098 discloses the preparation of highly dispersed multimetallic catalysts and their method of preparation from organometallic precursors. These catalysts are prepared by contacting the surface hydroxyl-containing inorganic oxide support with a metal pi-complex organometallic precursor such as molybdenum tetroallyl. The resulting product may be reduced or sulfided to form a catalyst of high activity.

T. G. Harvey et al. in *J. Chem. Soc. Chem. Commun.*, Pages 188–189 (1985) discloses that sulphided ruthenium supported on a Y-Zeolite is a very active catalyst for hydrodenitrogenation. This catalyst when physically combined with sulphided nickel molybdate on alumina produces a catalyst in which the activity is enhanced. The ruthenium-containing Y-zeolite is prepared by ion exchange with $Ru(NH_3)^{3+}{}_6$. The selectivity of the catalyst is not examined.

Additional references of interest include:

T. J. Lynch et al., *J. Molec. Cat.*, Vol. 17, Pages 109–112 (1982).

T. J. Lynch et al., "Iron Carbonyl Catalyzed Reductions of Model Coal Constituents Under Water Gas Shift Conditions" *Preprints, American Chemical Society, Division of Fuel Chemistry*, Vol. 28, No. 1, Pages 172–179 (1983).

R. H. Fish, "Homogenous Catalytic Hydrogenation .3 Selective Reductions of Polynuclear Aromatic and Heteroaromatic Nitrogen Compounds Catalyzed by Transition Metal Carbonyl Hydrides", *Ann of New York Acad. Sci.*, (ed. D. W. Slocum, et al.) Vol 415, Pages 292–301 (1983).

L. J. Boucher, et al., "New Catalysts for Coal Liquid Upgrading—Final Technical Report", Dept. of Energy Report No. DOE/PC/40812—T11 (DE84 015921), Aug. 15, 1984.

None of these references disclose the present invention.

With present technology most of the quinoline undergoes HDN by the darkened pathway of FIG. 1 which ultimately produces primarily propylcyclohexane. This pathway uses almost twice as much hydrogen as the other pathway that produces the more desirable (and higher octane) propylbenzene.

If NiMo or CoMo catalytic activity for C—N bond cleavage is enhanced relative the catalyst activity for hydrogenating the aromatic ring, a considerable savings in hydrogen costs and a more useful hydrocarbon product would be obtained. The present invention provides process and catalysts to achieve higher C—N bond cleavage with a reduction in hydrogenation. The present invention is also expected to be useful in hydrodeoxygenation (HDO) and hydrodesulfurization (HDS). The result is a significantly cheaper refined fossil fuel.

SUMMARY OF THE INVENTION

A process is provided for improving the hydrodenitrogenation of materials, containing organic materials, inorganic salts, metallic salts, sulfur-containing organic materials and nitrogen-containing organic materials. Usually the process is involved with hydrodenitrogenation of an organic feedstock which process comprises:

(a) forming a precatalyst itself comprising: (i) a first metal compound selected from compounds of nickel, cobalt or mixtures thereof; (ii) a second metal compound selected from compounds of chromium, molybdenum, tungsten, or mixtures thereof; and (iii) an inorganic support: (b) heating the precatalyst of step (a) with a source of sulfide in a first non-oxidizing gas at a temperature and for a time effective to presulfide the precatalyst: (c) adding in a second non-oxidizing gas to the sulfided precatalyst of step (b) an organometallic transition metal moiety selected from compounds of iridium, rhodium, iron, ruthenium, tungsten or mixtures thereof for a time and at a temperature effective to chemically combine the metal components; and (d) optionally heating the chemically combined catalyst of step (b) in vacuum at a temperature and for a time effective to remove residual volatile organic materials.

BRIEF DESCRIPTION OF THE DRAWINGS

FIG. 1 shows the reaction network for a quinoline - HDN reaction.

FIG. 4 shows the total hydrocarbon conversion using both the CoMo and RuCoMo catalysts.

DETAILED DESCRIPTION OF THE INVENTION AND PREFERRED EMBODIMENTS

Definition of Terms

As used herein:

"First non-oxidizing gas" and "second non-oxidizing gas" each independently refer to a non-oxidizing atmosphere of a gas selected from hydrogen, helium, nitrogen, neon, argon, carbon monoxide, FREONS ® boiling up to 60° C., mixtures of the preceding gases and the like.

"Inorganic support" describes those materials known in the art to be used as supports for catalysts used in the refining, hydrotreating etc. of liquid and solid fuels. These supports include zeolites, inorganic oxides, such as silica, alumina, magnesia, titanite and mixtures thereof, Alumina, silica and mixtures therof are presently preferred.

"Optional" or "optionally" means that the subsequently described event or circumstance may or may not occur, and that the description includes instance where said event or circumstance occurs and instances in which it does not. For example, "optionally heating" means that the heating may or may not be carried out in order for the process described to be within the present invention.

"Source of sulfide" refers to any suitable form or combinations which are known to produce sulfide (often as hydrogen sulfide) to further react with a substrate. These sulfur components include elemental (i.e. free) sulfur, hydrogen sulfide, dimethyl sulfide dimethyl disulfide, thiophene, carbon disulfide, mercaptans and other sulfur compounds. The components are usually added in the presence of sufficient hydrogen to produce the sulfide. In the present invention, hydrogen sulfide (and/or hydrogen), carbon disulfide and hydrogen are preferred.

"Transition metal moiety" refers generally to compounds of the Group VIb, VIIb and VIII elements of the Periodic Table. Preferred compounds are salts or organometallic compounds of iridium, rhodium, iron, ruthenium, tungsten or mixtures of these compounds. Salts include both inorganic salts, such as nitrates, sulfates, halides, (e.g., chlorides, bromides) carbonates and the like, and organic salts or compounds such as acetates, propionates, etc., carbonates, carbonyls, lower alkyl (1 to 10 carbon atoms), lower alkenyl (1–10 carbon atoms) carbonyl hydrides and the like. Preferably, the lower alkyl group have 1 to 4 carbon atoms and the lower alkenyl groups have 1 to 4 carbon atoms. Particularly preferred organometallic compounds are the transition metal carbonyls, acetates allyls ($CH_2=CH-CH-$).

The HDN reactivity of the sulfided commercial CoMo catalyst, and the catalyst prepared by doping of the sulfided CoMo catalyst with ruthenium were compared using quinoline as a model compound. As can been seen in FIG. 1, quinoline HDN produces two major products: propylcyclohexane (PCH) and propylbenzene (PB). Other intermediates in the Reaction Network and in the Figures include propylaniline (PR Aniline), propylcyclohexylamine (PCHA). decahydroquinoline (DHQ) as cis-isomer (DHQ-c), as trans-isomer (DHQ-t), quinoline (Q), benzotetrahydroquinoline (BzTHQ), and propylcychohexene (PCHE).

Figure 2A:
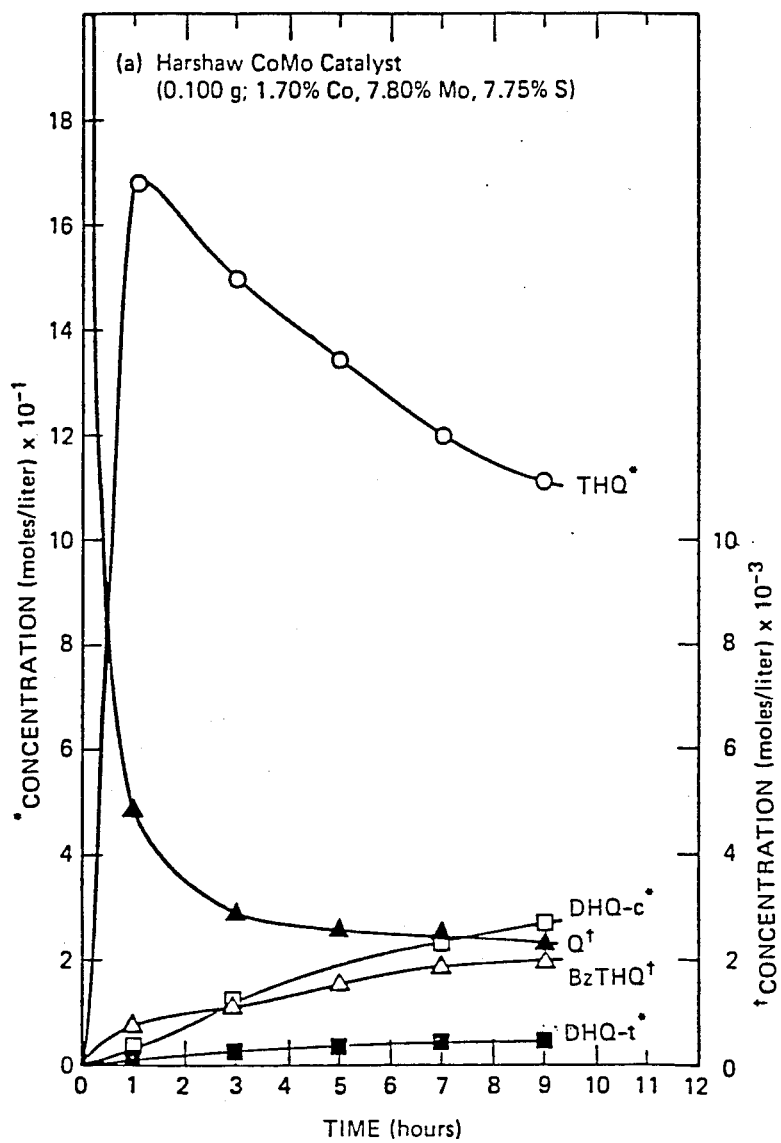
FIG. 2A shows the reaction profile of a hydrogenation reaction with quinoline using a commercial sulfided CoMo catalyst.
Figure 2B:
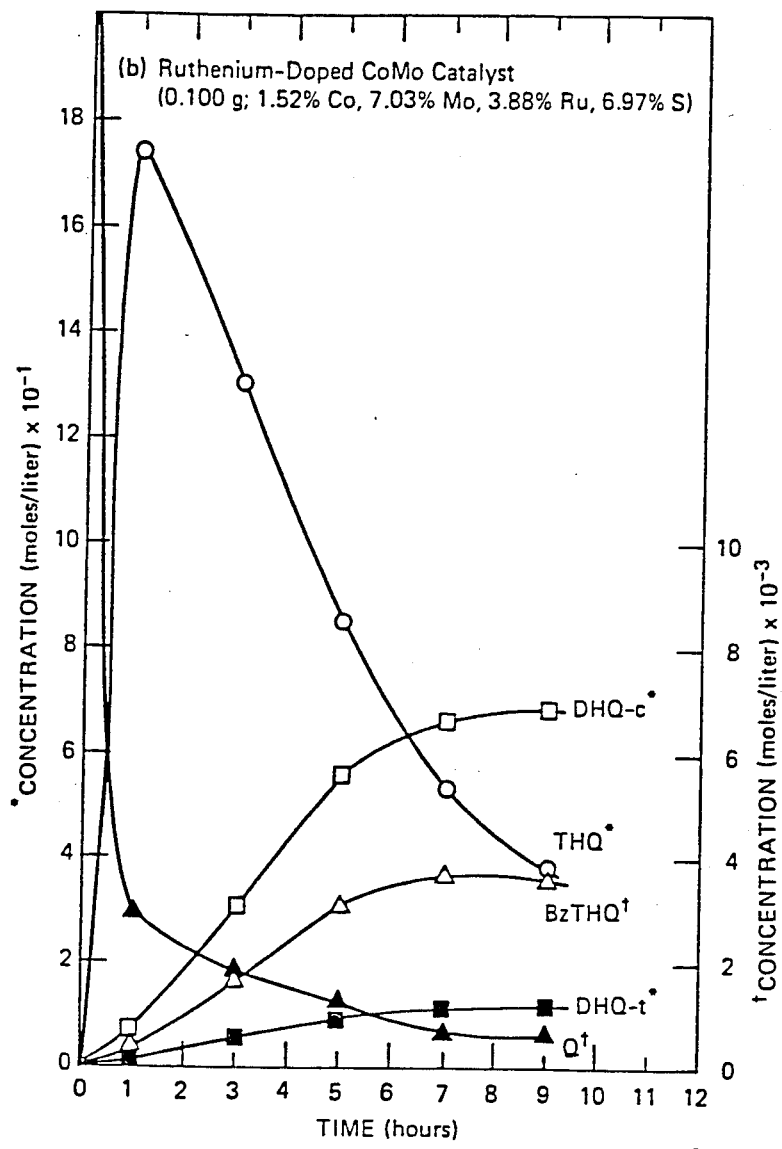
FIG. 2B shows the reaction profile and product distribution of a hydrogenation reaction with quinoline using a sulfided RuCoMo catalyst.

FIG. 2A and FIG. 2B present the reaction profiles of the hydrogenation reaction of quinoline comparing the effect of CoMo catalyst and RuCoMo catalyst, respectively to produce tetrahydroquinoline (THQ) and decahydroquinoline (DHQ).

In reading the Figures, if the scale of the reactants and products changes, these changes are designated by (*) and (+). If the left-hand vertical scale is marked (*), then products marked with the (*) are to be read at that designated concentration. If the right-hand vertical scale is marked (+) then the products marked with (+) are to be read at that designated concentration.

The CoMo catalyst is sulfided prior to adding (doping) of ruthenium as the carbonyl compound. It is important to know if sulfiding of the RuCoMo catalyst affects the activity and/or selectivity. Thus, the RuCoMo was sulfided at 200° C. in flowing $H_2S/H_2$. It was found that the reaction profile was nearly identical whether or not the combination of metals catalyst was sulfided prior to use. On the other hand where bulk ruthenium is sulfided and used as a HDN catalyst, (1) there are no hydrogenation reactions and (2) there is no evidence that any carbon-nitrogen bond cleavage occurs.

In Table 1 the turnover frequency for the disappearance of THQ increases from a value of 54 for the CoMo catalyst to a value of 141 for the RuCoMo catalyst. At the same time propylcyclohexane (PCH) increases from a value of 9 to a value of 27, and propylbenzene increases from a value of 0.5 to a value of 8.

TABLE 1

| TURNOVER FREQUENCIES FOR QUINOLINE HDN[a] | | | | | |
|---|---|---|---|---|---|
| | | TF | | | |
| Catalyst | Precursor | THQ[b] | PCH[c] | PB[c] | PCHE[c] |
| NiMo[d] | Conventional | 67.4 | 8.2 | 0.3 | 1.4 |
| CoMo[e] | Harshaw | 54.0 | 8.9 | 0.5 | 0.8 |
| RuCoMo[f] | $Ru_3(CO)_{12}$ + CoMo | 141 | 26.9 | 8.0 | 0 |
| WCoMo[g] | $W(CO)_6$ + CoMo | 57 | 4.6 | 0.6 | 1.7 |
| RhCoMo[h] | | 104.9 | 12.6 | 0.14 | |

TABLE 1-continued

| TURNOVER FREQUENCIES FOR QUINOLINE HDN[a] | | | | | |
|---|---|---|---|---|---|
| | | TF | | | |
| Catalyst | Precursor | THQ[b] | PCH[c] | PB[c] | PCHE[c] |
| RuNiMo[i] | | 87.7 | 9.9 | 4.3 | |

Figure 3A:
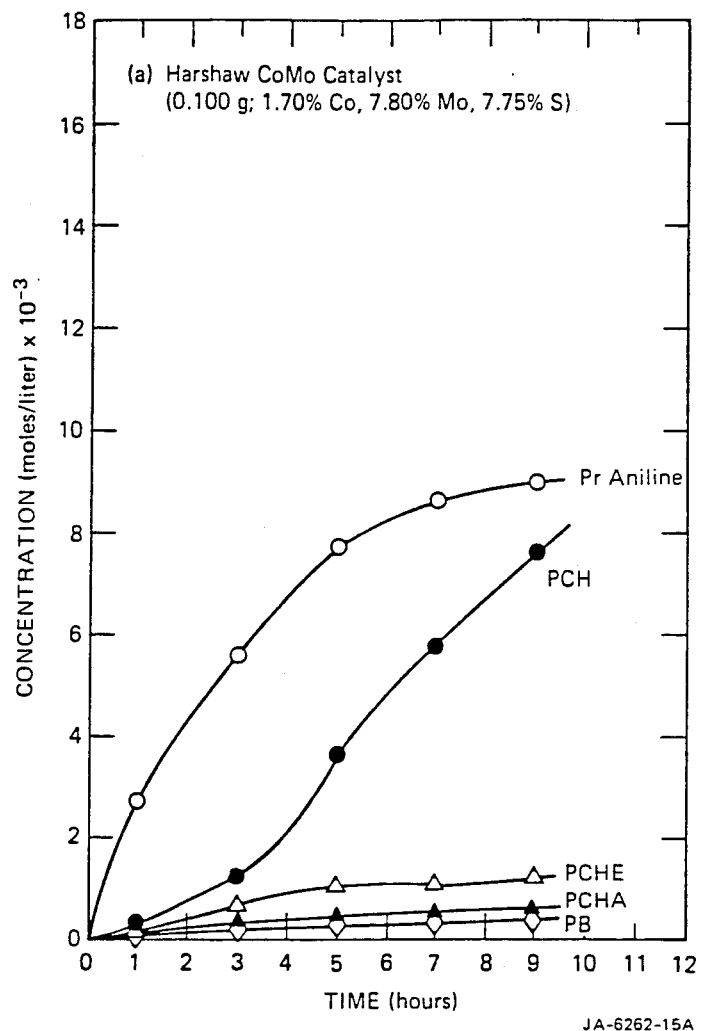
FIG. 3A shows the product distribution of an HDN reaction with quinoline due to carbon-nitrogen cleavage using a commercial CoMo catalyst.
Figure 3B:
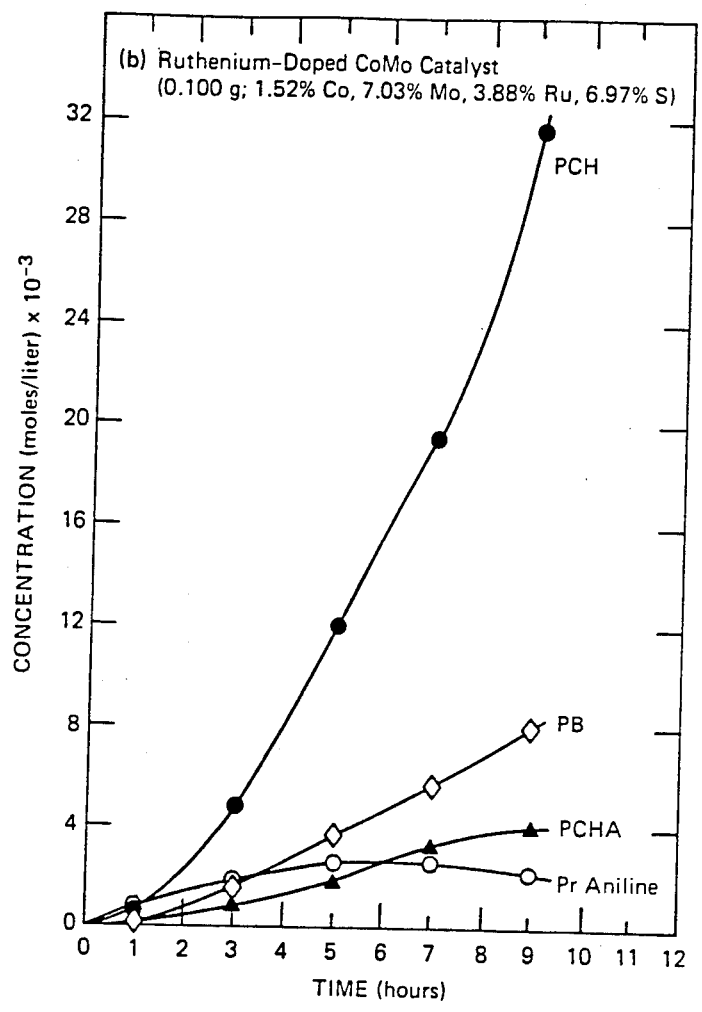
FIG. 3B shows the product distribution of an HDN reaction with quinoline due to carbon-nitrogen cleavage using a RuCoMo catalyst.
Figure 5A:
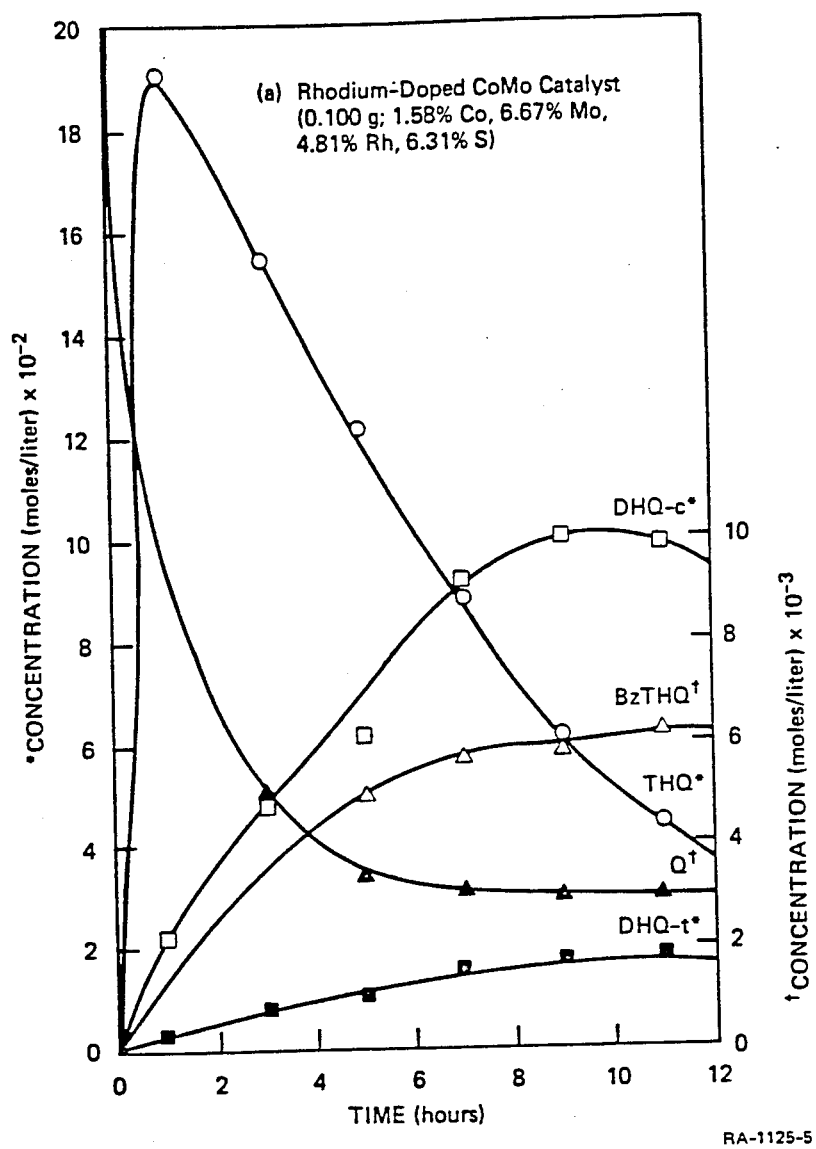
FIG. 5A shows the reaction profile of a hydrogenation reaction with quinoline using a sulfided RhCoMo catalyst.
Figure 5B:
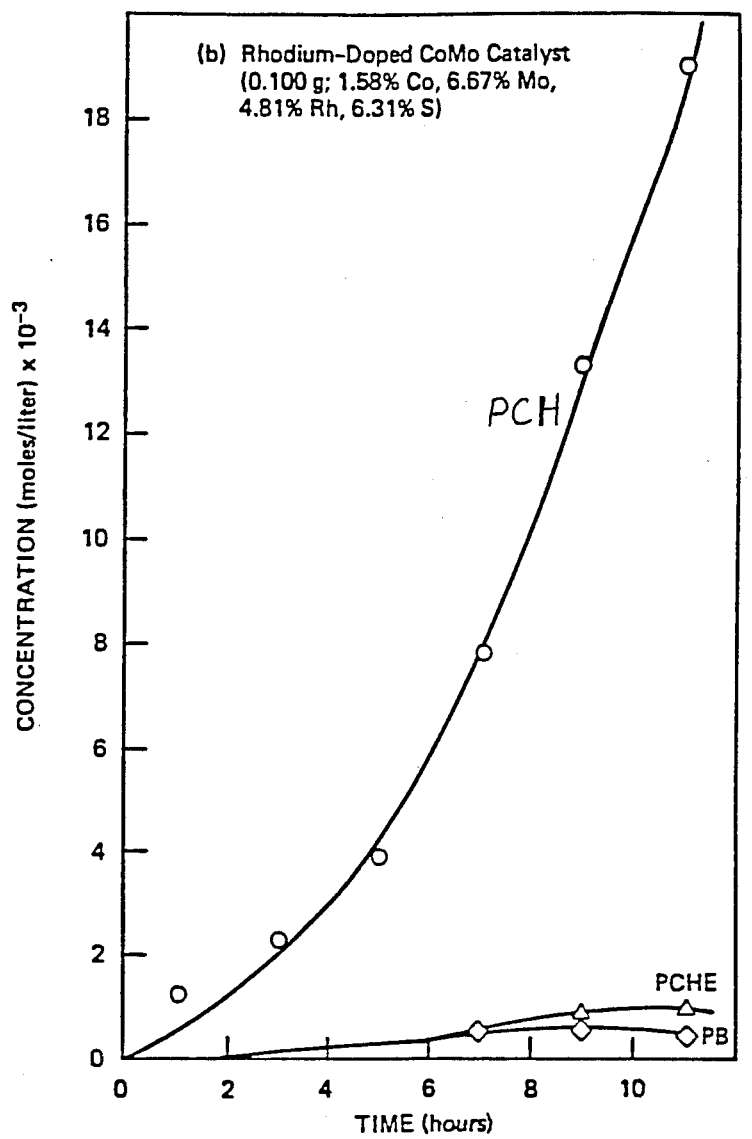
FIG. 5B shows the product distribution of an HDN reaction with quinoline due to carbon-nitrogen cleavage using a sulfided RhCoMo catalyst.
Figure 6A:
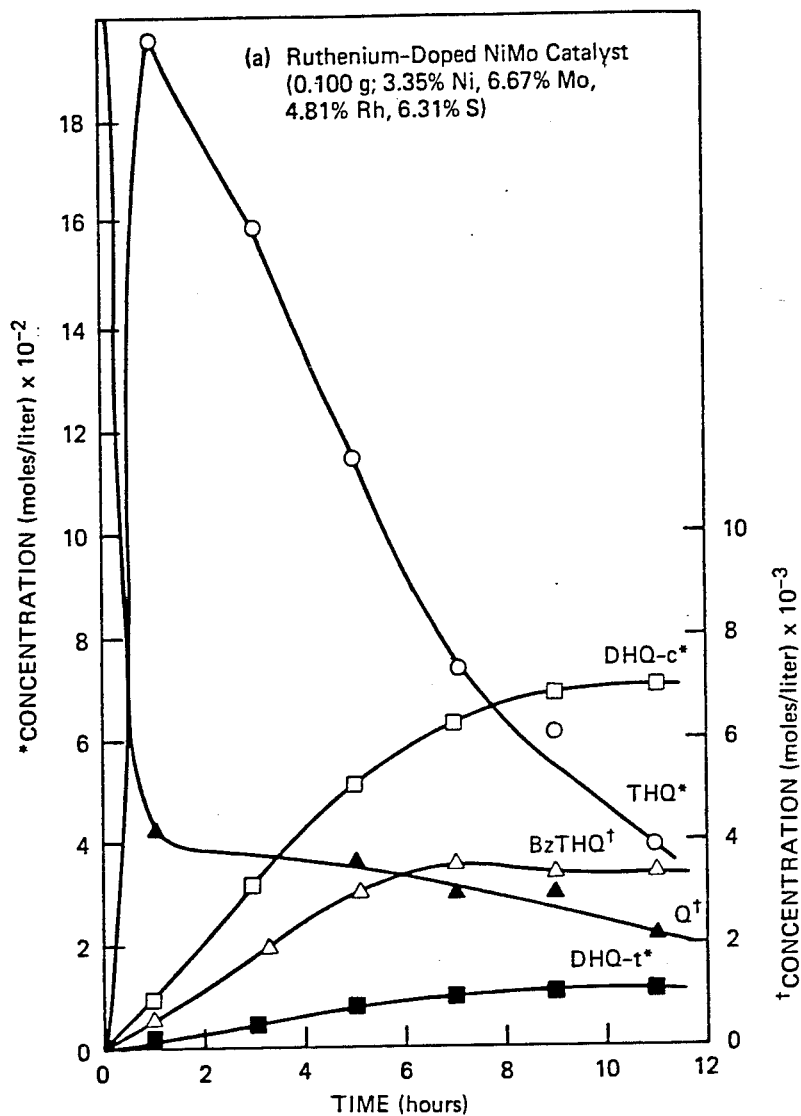
FIG. 6A shows the reaction profile of a hydrogenation reaction with quinoline using a sulfided RuNiMo catalyst.
Figure 6B:
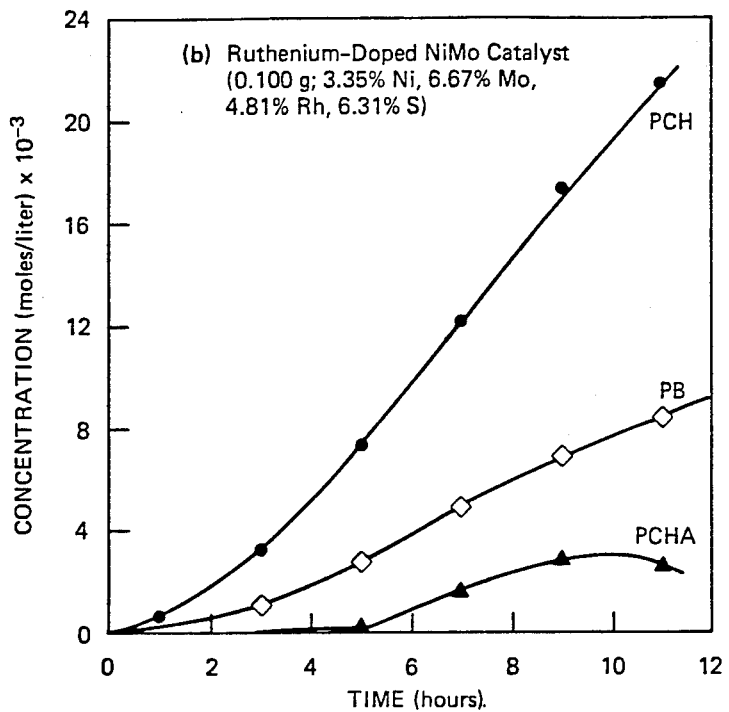
FIG. 6B shows the product distribution of an HDN reaction with quinoline due to carbon-nitrogen cleavage using a sulfided RuNiMo catalyst.
Figure 7A:
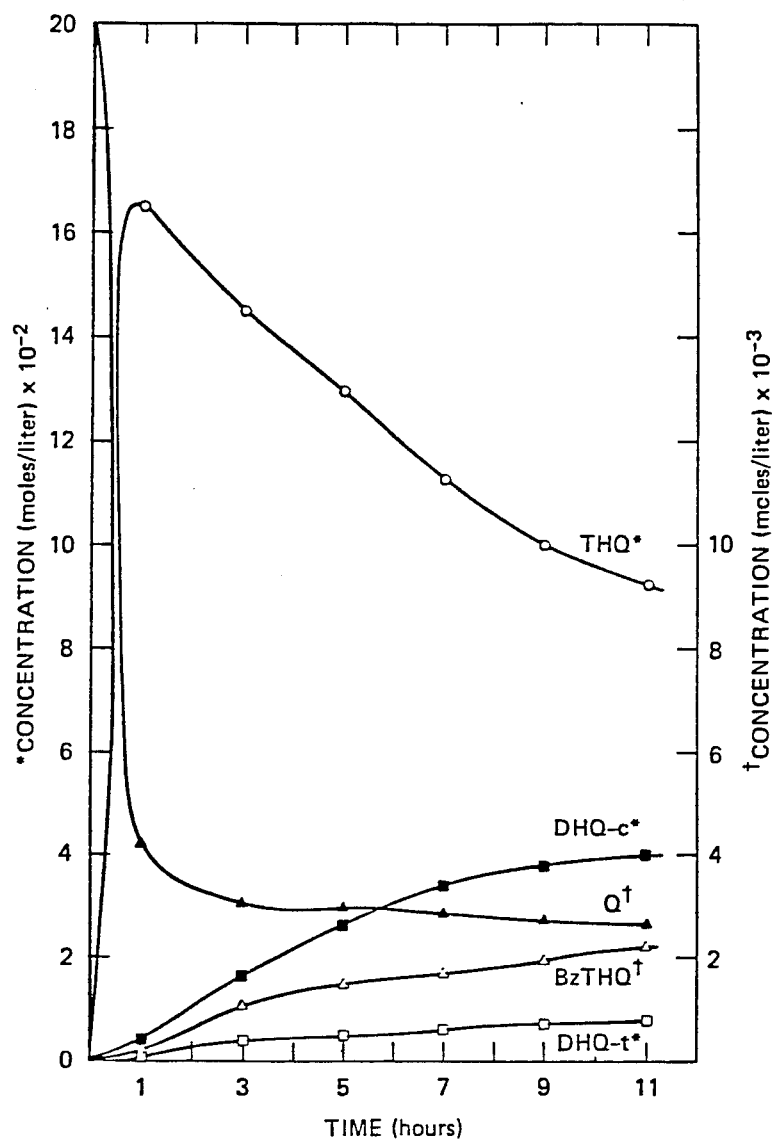
FIG. 7A shows the reaction profile of a hydrogen reaction with quinoline using a sulfided WCoMo catalyst.
Figure 7B:
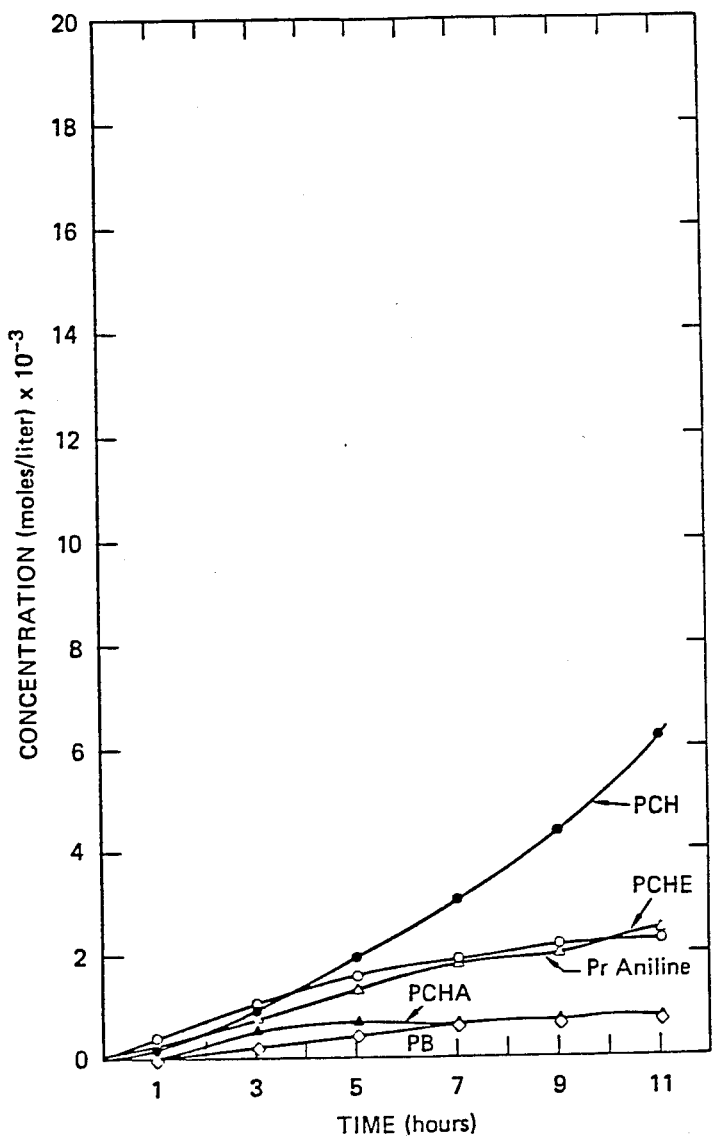
FIG. 7B shows the product distribution of an HDN reaction with quinoline due to carbon-nitrogen cleavage using a sulfided WCoMo catalyst.

[a]Moles product/moles metal catalyst/h ± 10%; reaction of 10 mL 0.197 M quinoline in n-hexadecane and catalyst at 350° C. and 500 psig $H_2$.
[b]Disappearance of THQ.
[c]appearance of hydrocarbon product.
[d]—
[e]FIGS. 2A and 3A (Sulfided).
[f]FIGS. 2B and 3B (Sulfided).
[g]FIGS. 7A and 7B (Sulfided).
[h]FIGS. 5A and 5B (Sulfided).
[i]FIGS. 6A and 6B (Sulfided).

FIG. 2A and FIG. 2B indicate that using the CoMo and RuCoMo catalysts that the quinoline is rapidly converted to tetrahydroquinoline (THQ) then either it (1) undergoes carbon-nitrogen bond cleavage to produce propylaniline or (2) undergoes hydrogenation to produce decahydroquinoline (DHQ). The DHQ then is subject to and undergoes subsequent HDN reactions.

Under similar conditions, FIG. 3A and FIG. 3B represent the carbon-nitrogen bond cleavage reaction. The turnover frequencies (the TF describes the ratio of the number of moles of substrate/the number of moles of metal catalyst/hour ±10%) for the disappearence of THQ produced from quinoline and the HDN product formation are calculated from FIG. 3A and FIG. 3B. These values are listed in Table 1.

Surprisingly, as is shown in FIG. 3B, propylcyclohexene (PCHE) does not form at all using the RuCoMo. Not wishing to be bound by theory, it appears that the ruthenium promoted catalyst enhances PCHE dehydrogenation to propylbenzene, or the mechanism of HDN under these conditions has changed.

FIG. 4 shows the total hydrocarbon conversion as a function of time. The relative product distribution for the two catalyst under equivalent conditions. Thus, the concentrations of PB, PCH and PCHE at total quinoline conversion of 5 mole percent were determined by extrapolation and are listed in Table 2.

TABLE 2

| HYDROCARBON PRODUCT DISTRIBUTION AT 5 MOL % HDN CONVERSION[a] | | | |
|---|---|---|---|
| Catalyst | % PCH | % PB | % PCHE |
| CoMo | 82.2 | 4.6 | 13.2 |
| RuCoMo | 76.6 | 23.4 | 0 |

[a]Reaction of 10 mL 0.197 M quinoline in n-hexadecane and catalyst at 350° C. and 500 psig $H_2$.

For the CoMo catalyst high octane value propylbenzene is only 4.6% of the total hydrocarbon product; however for the RuCoMo catalyst propylbenzene (aromatic) is 23.4 percent of the total hydrocarbon product. The use of the RuCoMo catalyst results in a reduction of about 10% in the hydrogen consumption just for quinoline HDN. This reduction in hydrogen consumption does not consider any potential additional savings that might result from decreased hydrogenation of non-nitrogen containing aromatic compounds which are present in fuel feedstocks.

RhCoMo—The product distribution for the RhCoMo catalyst is shown in FIG. 5A, FIG. 5B and in Table 1. As shown, the rate of disappearance of THQ (105) is greater than with the single CoMo catalyst and less than the RuCoMo (141). In a similar way, the PCH turnover frequency value of 12.6 is greater than for the CoMo catalyst value of 8.9 but less than the RuCoMo catalyst value of 26.9. The PB turnover frequency value of 0.14 for the RhCoMo catalyst is lower than the values for both CoMo and the RuCoMo catalyst which are 0.5 and 8.0, respectively. Thus Rh promotes hydrogenation more than it induces C—N bond cleavage reactions. This is consistent with results of sulfiding of the bulk metals.

The comparative reactions using RuNiMo and WCoMo as catalysts are described in the Examples below.

In all catalysts described herein where a transition metal carbonyl compound is used to dope a CoMo or NiMo catalyst after sulfiding, there is between about 0.5–3% by weight (preferably between about 1 and 2% by weight) of residual carbon remaining in the active catalyst, presumably as carbon monoxide.

RuNiMo—As seen in the FIGS. 6A & 6B and in Table 1, the activity of the ruthenium-doped Ni Mo catalyst is less than that of the RuCoMo catalyst but greater than that of the CoMo catalyst. For instance, the RuNiMo TF disappearance of THQ is 87.7, compared with 54.0 for the CoMo and 141 for the RuCoMo catalysts. The TF values for the appearance of PCH and PB are 9.9 and 4.3 respectively, for the RuNiMo catalyst, compared with values of 8.9 and 0.5 for the CoMo catalyst and 26.9 and 8.0 for the RuCoMo catalyst, respectively. Thus, the ruthenium-doped NiMo catalyst is superior to the CoMo catalyst in terms of activity, but is only about one-half as active as the RuCoMo catalyst. In terms of selectivity, however, the RuNiMo catalyst is the best catalyst, with a PCH to PB ratio of 2.5 to 1 compared to 3.1 to 1 for the RuCoMo catalyst and 17 to 1 for the CoMo catalyst. Furthermore, as with the RuCoMo catalyst, no proplycyclohexene (PCHE) is observed with the RuNiMo catalyst.

The first embodiment is described in the SUMMARY above. In a second embodiment the process additionally includes after step (a) and before step (b) preheating of the precatalyst to remove organic materials between about ambient and 500° C.

In a third embodiment of the process, in step (a) in the precatalyst the first metal compound is cobalt oxide, the second metal is molybdenum oxide and the inorganic oxide support is alumina; and in step (c) the organometallic transistion metal moiety is selected from compounds of ruthenium and tungsten.

In a fourth embodiment the organic feedstock is selected from a crude petroleum residue, a petroleum fraction, an oil shale fraction, a tar sands fraction, a coal powder, a coal-derived liquid or mixtures thereof; and in step (a) in the precatalyst, the first metal compound is cobalt oxide, the second metal is molybdenum oxide and the inorganic oxide support is alumina; and in step (c) the organometallic transition metal moiety is selected from compounds of ruthenium and tungsten.

In the fifth through the ninth embodiments in the process the transition metal moiety in step (c) is a metal carbonyl compound, preferably independently selected from a ruthenium carbonyl, an iron carbonyl, or a tungsten carbonyl.

The tenth through twelfth embodiments include the catalysts formed by the process of the above embodiments.

The thirteenth embodiment, the organic feedstock is selected from a crude petroleum residue, a petroleum fraction, an oil shale fraction, a tar sands fraction, a coal powder, a coal-derived liquid or mixtures thereof; and in step (a) in the precatalyst, the first metal compound is nickel oxide, the second metal is molybdenum oxide and the inorganic oxide support is alumina; and in step (c) the organometallic transition metal moiety is selected from compounds of ruthenium, iron and tungsten.

The fourteenth through seventeenth embodiments include the transition metal moiety in step (c) being a metal carbonyl compound, preferably a ruthenium carbonyl, an iron carbonyl or a tungsten carbonyl.

The eighteenth through the twentieth embodiments independently include the catalysts formed by the immediately above discussed process.

In the twenty-first embodiment is described a process for forming a catalyst for the hydrodenitrogenation of an organic feedstock, comprising the followingsteps:

(a) from a precatalyst itself comprising:
   (i) a first metal compound selected from compounds of nickel, cobalt or mixtures thereof;
   (ii) a second metal compound selected from compounds of chromium, molybdenum, tungsten or mixtures thereof; and
   (iii) an inorganic support;
   optionally subsequently preheating the precatalyst between ambient and 500° C. in flowing air;

(b) sulfiding the precatalyst of step (a) by contact with between about 1 and 30 percent by volume of a source of sulfide in a first non-oxidizing gas selected from hydrogen, helium, neon, nitrogen, argon, carbon monoxide, Freons ® or mixtures thereof, with heating for between about 6 and 24 hours;

(c) combining the precatalyst of step (b) with an organometallic transition metal moiety selected from iridium, rhodium, iron, ruthenium, tungsten or mixtures thereof in a second non-oxidizing gas selected from hydrogen, helium, nitrogen, neon, argon, carbon monoxide or mixtures thereof at a temperature between about ambient to 400° C. for a time sufficient to form said catalyst; and (d) optionally heating in a vacuum the chemically combined catalyst of step (c) at between about 50° and 100° C. for a time sufficient to activate said catalyst.

In the twenty-second embodiment is described the process wherein in step (a) the precatalyst is heated at between about 350° and 450° C.

In the twenty-third embodiment is described the process in step (c) the source of sulfide being present in between about 1 and 10 percent by volume, the second non-oxidizing gas is hydrogen, and the temperature being between about 180° and 370° C.

In the twenty-fourth embodiment the process includes the step wherein the source of sulfide is selected from hydrogen in combination with sulfur, hydrogen sulfide, dimethyl sulfide, dimethyl disulfide, thiophene, carbon disulfide, mercaptans or mixtures thereof.

In the twenty-fifth through the twenty-seventh embodiment the process is described wherein in step (c) the transition metal moiety is a metal carbonyl compound, preferably independently selected from ruthenium carbonyl, tungsten carbonyl, iron carbonyl or mixtures thereof.

In the twenty-eighth embodiment describes the catalyst formed by the process of claim 21.

In the twenty-ninth embodiment is disclosed the process wherein:

in step (a) the first metal compound is cobalt oxide, the second metal compound is molybdenum oxide, and the inorganic oxide support is alumina, wherein the precatalyst is heated at between about 350° and 450° C.;

in step (b) the source of sulfide is selected from sulfur, hydrogen sulfide or carbon disulfide in between about 1 and 20 percent by volume in hydrogen and the temperature is between about 180° and 370° C.; and in step (c) the transition metal moiety is a metal carbonyl compound.

In the thirtieth through the thirty-third embodiment is described the process wherein the metal carbonyl compound is independently selected from ruthenium carbonyl, iron carbonyl, tungsten carbonyl or mixtures thereof. Preferably, the metal carbonyl compound is a mixture of ruthenium carbonyl and iron carbonyl.

In the thirty-fourth embodiment is disclosed the process wherein:

in step (a) the first metal compound is nickel oxide, the second metal compound is molybdenum oxide, and the inorganic oxide support is alumina, wherein the precatalyst is heated at between about 350° and 450° C.;

in step (b) the source of sulfide is selected from sulfur, hydrogen sulfide or carbon disulfide in between about 1 and 20 percent by volume in hydrogen and the temperature is between about 180° and 370° C.; and in step (c) the transition metal moiety is a metal carbonyl compound.

In the thirty-fifth through the thirty-seventh embodiment is disclosed the process wherein the metal carbonyl compound is independently selected from ruthenium carbonyl, iron carbonyl, tungsten carbonyl or mixtures thereof.

In the thirty-eight through the fourty-seventh embodiment is disclosed the catalyst which is obtained from each of the processes describe in the following claims: 21, 29, 30, 31, 32, 33, 34, 35, 36 or 37.

In the fourth-eighth through the fifty-seventh embodiment is disclosed a process for the hydrodenitrogenation of an organic feedstock selected from a crude petroleum residue, a petroleum fraction, an oil shale fraction, a tar sands fraction, a coal powder, a coal-derived liquid or mixtures thereof which feedstock contains between about 0.1 and 5 percent by weight of nitrogen, which process comprises: contacting said organic feedstock with hydrogen under hydrodenitrogeration temperature and pressure conditions in the presence of a catalyst independently selected from the catalysts of claim 10, 11, 12, 18, 19, 20, 34, 35, 36, 37, 38, 39, 40, 41, 42, or 43.

The following Examples are intended to be illustrative and not to be limiting in any way.

Materials—The cobalt/molybdenum (HT-400) catalyst was obtained from Harshaw Chemical Co. (Cleveland, Ohio) (3 weight % $CoO_3$, 15.1 weight percent $MoO_3$, on alumina). Quinoline, n-dodecane, and n-hexadecane were obtained from Aldrich Chemical Company. Quinoline was distilled from calcium hydride under nitrogen.

EXAMPLE 1

Pre-catalyst Preparation (a) CoMo. The cobalt-molybdenum catalyst was ground and sieved to obtain a 60–200 (74–250 micrometer[2]) mesh powder. The catalyst was activated at 400° C. in a flowing mixture of 10% $H_2S$ in $H_2$ for 12 hr, then stored under $N_2$. (Before the catalyst was sulfided, it was heated for 2 hr at 400° C. under flowing synthetic air, pre-treated with $H_2S/H_2$ mixture for 1 h at room temperature, then slowly heated to 400° C. over a 2-hr period). Anal.: Mo. 7.8%; S, 7.75%; Co, 1.70%

EXAMPLE 2

Catalyst Preparation (a) RuCoMo. Under $N_2$, ruthenium carbonyl, $Ru_3(CO)_{12}$, (0.53 g from Alfa), dissolved in 5 ml of hexane, was added to a stirred slurry of 2.00 g of the sulfided CoMo catalyst in 10 ml of hexane. The mixture was allowed to stir for 72 hr. The hexane was then evaporated and the residue heated under vacuum at 76° C. for 6 hr. Anal.: Mo, 6.71%; Co, 1.39%; Ru, 4.29%; S. 8.22%; C, 2.76%.

In another preparation, the doped catalyst was then sulfided by treating with a flowing mixture of $H_2S(10\%)/H_2$ at 200° C. for 12 hr. Anal. for RuCoMo: Mo, 6.71%; Co, 1.39%; Ru, 4.29%; S. 8.22%; C, 2.01%.

(b) Similarly, as is described above in Example 2, subpart (a), the reaction is repeated except except that an equivalent amount by weight of iron carbonyl, Fe($CO)_6$, is used rather than ruthenium carbonyl.

(c) Similarly, as is described above in Example 2, subpart (a), the reaction is repeated except that the carbonyl is a mixture of a one-half equivalent amount by weight of ruthenium carbonyl and one-half equivalent amount by weight of iron carbonyl, Fe$(CO)_6$, rather than ruthenium carbonyl.

(d) RuNiMo. Under nitrogen, ruthenium carbonyl, $Ru_3(CO)_{12}$ (0.105 g, from Alfa), dissolved in 5 mL of hexane was added to a stirred slurry of 1.00 g of sulfided NiMo catalyst in 10 mL of hexane. The mixture was stirred for 72 hr. The hexane was evaporated and the residue was heated under vacuum at 76° C. for 6 hr. Anal.: Mo, 8.31%; Ni, 2.15%; Ru, 3.65%; S, 5.78%; C, 1.85%.

(e) RhCoMo. The rhodium-based catalyst was prepared as described above [subpart (d)] for the RuNiMo catalyst, using 0.0873 g of $Rh_6(CO)_{16}$ (from Alfa) per gram of sulfided Co Mo catalyst. Anal.: Mo, 6.67%; Co, 1.58%; Rh, 4.81%; S, 6.31%; C, 2.09%.

(f) WCoMo. The tungsten-doped catalyst was prepared as described above with the RuCoMo catalyst, using 0.135 g of tungsten carbonyl per gram of sulfided CoMo catalyst. The doped catalyst was not further sulfided. Anal.: Mo, 7.74%; Co, 1.73%; W, 2.92%; S, 6.71%;

(g) Similarly as is described above in Example 2, subpart (a), the process is repeated except that an equivalent amount by weight of iridium carbonyl is used rather than ruthenium carbonyl.

Analytical Procedures

Product analyses for all the kinetic studies were performed on a Hewlett Packard 5880 GC with 15 m DB-1 capillary column equipped with a FID. GC-Mass Spectral analyses were performed using an LKB-9000 or Ribermag R 10 10 mass spectrometer. Elemental analyses were obtained from Galbraith Laboratories.

Standard HDN Reaction Procedures

To obtain comparative results, all HDN reactions were performed as follows:

The following materials were placed in a quartz liner, under $N_2$ in a 45-ml Parr bomb: 0.100 g of catalyst, a glass stir bar, and 10 ml of 0.197 M quinoline and 0.098 M n-dodecane (as internal standard) in n-hexadecane. The bomb was then purged, pressurized with 500 psia of $H_2$, and heated at 350° C. for the desired or indicated time.

The results obtained are described in FIGS. 2A, 2B, 3A, 3B, 4, 5A, 5B, 6A, 6B, 7A and 7B.

EXAMPLE 4

Hydrodenitrogenation with CoMo Catalyst

10-Milliliters of 0.197M quinoline in n-hexadecane were combined with sulfided CoMo catalyst (Harshaw) at 350° C. and 500 psia hydrogen. The CoMo catalyst (0.100 g) analyzed as 1.70% Co.; 7.80% Mo; 7.75% sulfur; C, 2.76%. The product distribution is shown in FIG. 2A.

EXAMPLE 5

Hydrodenitrogenation with RuCoMo Catalyst (a) The reaction is repeated as is described in Example 4. The RuCoMo catalyst (0.100 g) analyzed as 1.52% Co.; 7.03% Mo 3.88% Ru; and 6.97% sulfur. The product distribution is shown in FIG. 2B.

(b) Similarly, the reaction described in subpart (a) above is repeated except that ruthenium is replaced with a 0.100 g amount of a 50/50 mixture of ruthenium and iron catalyst. The results are expected to parallel those found in FIG. 2B.

(c) The reaction is repeated as is described in Example 4 above except that the RuCoMo catalyst is replaced with an equal weight of RhCoMo catalyst prepared in Example 3, subpart (d). The results are found in FIGS. 5A and 5B and in Table 1.

(d) The reaction is repeated as is described in Example 4 except that the RuCoMo catalyst is replaced with an equal weight of RuNiMo catalyst prepared in Example 3, subpart (e). The results are found in FIGS. 6A and 6B and in Table 1.

(e) The reaction is repeated as is described in Example 4 above except that the RuCoMo catalyst is replaced with an equal weight of WCoMo catalyst prepared in Example 3, subpart (f). The results are found in FIGS. 7A and 7B and in Table 1.

Overall it appears that preferred HDN catalysts are obtained when the first metal compound is present in between about 1 to 3 percent by weight (as the metal), the second metal compound is present in between about 2 to 10 percent by weight (as the metal), carbonyl metal is present in between about 2–6 percent by weight as the metal, and sulfur is present in between about 4 to 10 percent by weight. (first metal/second metal/added metal, preferably as carbonyl) Carbon when present is between about 1 and 4 percent.

Preferred cobalt catalysts include CoCrIr, CoCrRh, CoCrFe, CoCrRu, CoCrW, CoMoIr, CoMoRh, CoMoFe, CoMoRu, CoMoW, CoWIr, CoWRh, CoWFe, CoWW, and CoWRu.

Preferred nickel catalysts include NiCrIr, NiCrRh, NiCrFe, NiCrRu, NiCrW, NiMoIr, NiMoRh, NiMoFe, NiMoRu, NiMoW, NiWIr, NiWRh, NiWi, NiWRu and NiWW. Particularly preferred are those metal carbonyl compounds which have no additional different organic ligands. The first and second metals are preferably present as the oxides and formed as is described in U.S. Pat. No. 4,462,897, which is incorporated by reference.

While some embodiments of the invention have been shown and described herein, it will become apparent to those skilled in the art that various modifications and changes can be made in the process of forming hydrodenitrogenation catalysts and their use in the hydrodenitrogenation of organic materials found in feedstocks without departing from the spirit and scope of the present invention. All such modifications and changes coming within the scope of the appended claims are intended to be covered thereby.

We claim:

1. A process for the preparation of a multimetallic catalyst for the hydrodenitrogenation of an organic feedstock, which process comprises:
   (a) forming a precatalyst itself comprising: (i) a first metal compound selected from compounds of nickel, cobalt or mixtures thereof; (ii) a second metal compound selected from compounds of chromium, molybdenum, tungsten, or mixtures thereof; and (iii) an inorganic support;
   (b) heating the precatalyst of step (a) with a source of sulfide in a first non-oxidizing gas at a temperature and for a time effective to presulfide the precatalyst;
   (c) adding in a second non-oxidizing gas to the sulfided precatalyst of step (b) an organometallic transition metal moiety selected from compounds of iridium, rhodium, iron, ruthenium, tungsten or mixtures thereof for a time and at a temperature effective to chemically combine the metal components; and
   (d) optionally heating the chemically combined catalyst of step (b) in vacuum at a temperature and for a time effective to remove residual volatile organic materials.

2. The process of claim 1 wherein the process additionally includes after step (a) and before step (b) preheating of the precatalyst to remove organic materials about ambient and 500° C.

3. The process of claim 1 wherein:
   in step (a) in the precatalyst the first metal compound is cobalt oxide, the second metal is molybdenum oxide and the inorganic oxide support is alumina; and in step (c) the organometallic transition metal moiety is selected from compounds of ruthenium and tungsten.

4. The process of claim 1 wherein the organic feedstock is selected from a crude petroleum residue, a petroleum fraction, an oil shale fraction, a tar sands fraction, a coal powder, a coal-derived liquid or mixtures thereof; and
   in step (a) in the precatalyst, the first metal compound is cobalt oxide, the second metal is molybdenum oxide and the inorganic oxide support is alumina; and
   in step (c) the organometallic transition metal moiety is selected from compounds of ruthenium and tungsten.

5. The process of claim 1 wherein the transition metal moiety in step (c) is a metal carbonyl compound.

6. The process of claim 5 wherein the transition metal moiety in step (c) is a ruthenium carbonyl compound.

7. The process of claim 5 wherein the transition metal moiety in step (c) is an iron carbonyl compound.

8. The process of claim 5 wherein the transition metal moiety in step (c) is a tungsten carbonyl compound.

9. The process of claim 4 wherein in step (c) the transition metal moiety is a ruthenium carbonyl compound.

10. The catalyst formed by the process of claim 1.
11. The catalyst formed by the process of claim 5.
12. The catalyst formed by the process of claim 6.
13. The process of claim 1 wherein the organic feedstock is selected from a crude petroleum residue, a petroleum fraction, an oil shale fraction, a tar sands fraction, a coal powder, a coal-derived liquid or mixtures thereof; and
   in step (a) in the precatalyst, the first metal compound is nickel oxide, the second metal is molybdenum oxide and the inorganic oxide support is alumina; and
   in step (c) the organometallic transition metal moiety is selected from compounds of ruthenium, iron and tungsten.

14. The process of claim 13 wherein the transition metal moiety in step (c) is a metal carbonyl compound.

15. The process of claim 14 wherein the transition metal moiety in step (c) is a ruthenium carbonyl compound.

16. The process of claim 14 wherein the transition metal moiety in step (c) is an iron carbonyl compound.

17. The process of claim 14 wherein the transition metal moiety in step (c) is a tungsten carbonyl compound.

18. The catalyst formed by the process of claim 13.
19. The catalyst formed by the process of claim 14.
20. The catalyst formed by the process of claim 15.

21. A process for forming a catalyst for the hydrodenitrogenation of an organic feedstock, comprising the following steps:
   (a) from a precatalyst itself comprising:
      (i) a first metal compound selected from compounds of nickel, cobalt or mixtures thereof;
      (ii) a second metal compound selected from compounds of chromium, molybdenum, tungsten or mixtures thereof; and
      (iii) an inorganic support; optionally subsequently preheating the precatalyst between ambient and 500° C. in flowing air;
   (b) sulfiding the precatalyst of step (a) by contact with between about 1 and 30 percent by volume of a source of sulfide in a first non-oxidizing gas selected from hydrogen, helium, neon, nitrogen, argon, carbon monoxide, fluorinated hydrocarbons boiling up to 60° C. or mixtures thereof, with heating for between about 6 and 24 hours;
   (c) combining the precatalyst of step (b) with an organometallic transition metal moiety selected from iridium, rhodium, iron, ruthenium, tungsten or mixtures thereof in a second non-oxidizing gas selected from hydrogen, helium, nitrogen, neon, argon, carbon monoxide or mixtures thereof at a temperature between about ambient to 400° C. for a time sufficient to form said catalyst; and
   (d) optionally heating in a vacuum the chemically combined catalyst of step (c) at between about 50° and 100° C. for a time sufficient to activate said catalyst.

22. The process of claim 21 wherein in step (a) the precatalyst is heated at between about 350° and 450° C.

23. The process of claim 22 wherein in step (c) the source of sulfide being present in between about 1 and 10 percent by volume, the second non-oxidizing gas is hydrogen, and the temperature is between about 180° and 370° C.

24. The process of claim 23 wherein the source of sulfide is selected from hydrogen in combination with sulfur, hydrogen sulfide, dimethyl sulfide, dimethyl disulfide, thiophene, carbon disulfide, mercaptans or mixtures thereof.

25. The process of claim 24 wherein in step (c) wherein the transition metal moeity is a metal carbonyl compound.

26. The process of claim 25 wherein the metal carbonyl compound is selected from ruthenium carbonyl, tungsten carbonyl, iron carbonyl or mixtures thereof.

27. The process of claim 26 wherein in step (c) the transition metal moiety is ruthenium carbonyl compound.

28. The catalyst formed by the process of claim 21.
29. The process of claim 21 wherein:
   in step (a) the first metal compound is cobalt oxide, the second metal compound is molybdenum oxide, and the inorganic oxide support is alumina, wherein the precatalyst is heated at between about 350° and 450° C.;
   in step (b) the source of sulfide is selected from sulfur, hydrogen sulfide or carbon disulfide in between about 1 and 20 percent by volume in hydrogen and the temperature is between about 180° and 370° C.; and
   in step (c) the transition metal moiety is a metal carbonyl compound.

30. The process of claim 29 wherein the metal carbonyl compound is selected from ruthenium carbonyl, iron carbonyl, tungsten carbonyl or mixtures thereof.

31. The process of claim 30 wherein the metal carbonyl compound is a mixture of ruthenium carbonyl and iron carbonyl.

32. The process of claim 29 wherein in step (c) the transition metal moiety is a ruthenium carbonyl.

33. The process of claim 29 wherein the metal carbonyl is tungsten carbonyl.

34. The process of claim 21 wherein:
   in step (a) the first metal compound is nickel oxide, the second metal compound is molybdenum oxide, and the inorganic oxide support is alumina, wherein the precatalyst is heated at between about 350° and 450° C.;
   in step (b) the source of sulfide is selected from sulfur, hydrogen sulfide or carbon disulfide in between about 1 and 20 percent by volume in hydrogen and the temperature is between about 180° and 370° C.; and
   in step (c) the transition metal moiety is a metal carbonyl compound.

35. The process of claim 34 wherein the metal carbonyl compound is selected from ruthenium carbonyl, iron carbonyl, tungsten carbonyl or mixtures thereof.

36. The process of claim 34 wherein in step (c) the transition metal moiety is a ruthenium carbonyl.

37. The process of claim 34 wherein the metal carbonyl is tungsten carbonyl.

38. The catalyst obtained from the process of claim 21.

39. The catalyst obtained from the process of claim 29.

40. The catalyst obtained from the process of claim 30.

41. The catalyst obtained from the process of claim 31.

42. The catalyst obtained from the process of claim 32.

43. The catalyst obtained from the process of claim 33.

44. The catalyst obtained from the process of claim 34.

45. The catalyst obtained from the process of claim 35.

46. The catalyst obtained from the process of claim 36.

47. The catalyst obtained from the process of claim 37.

* * * * *